May 4, 1926.

A. D. WHIPPLE 1,583,379

MOTION TRANSMITTING APPARATUS

Filed August 8, 1919

Witness

Inventor
Allen D. Whipple
By Erwin Wheeler & Woodard
Attorneys

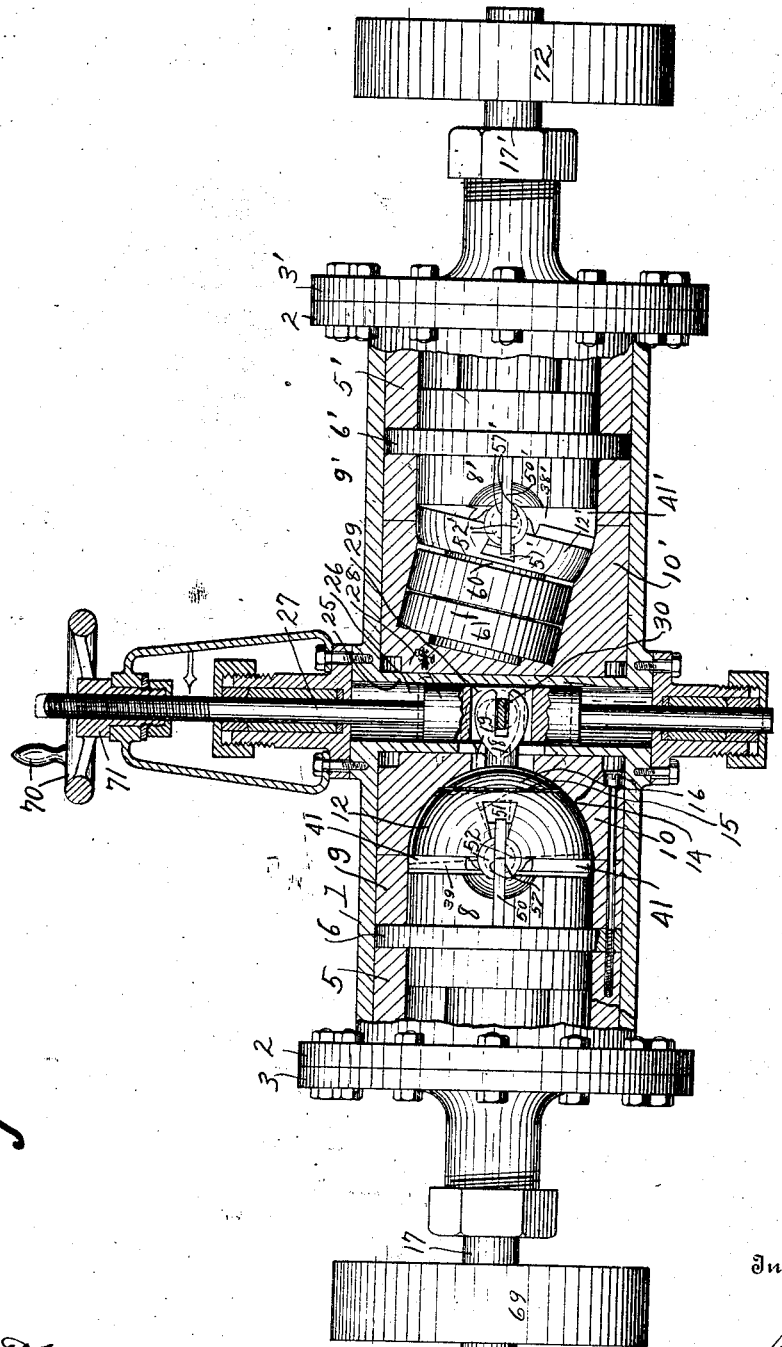

May 4, 1926.
A. D. WHIPPLE
MOTION TRANSMITTING APPARATUS
Filed August 8, 1919
1,583,379
3 Sheets-Sheet 3
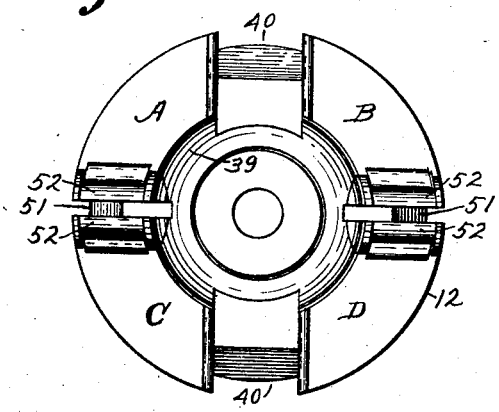
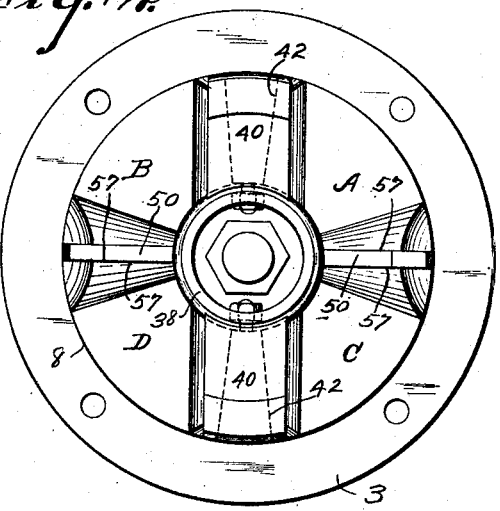
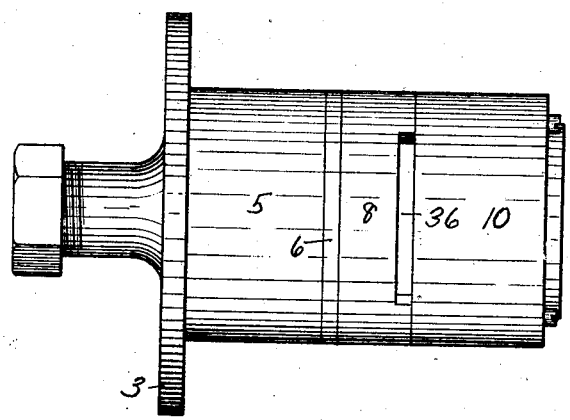
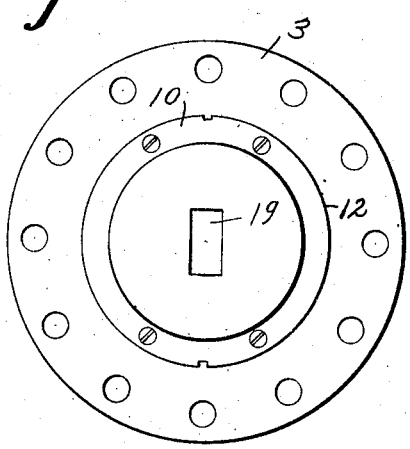
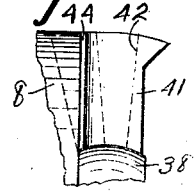
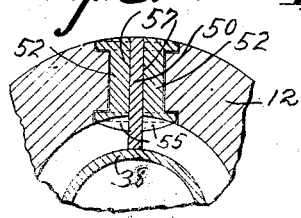
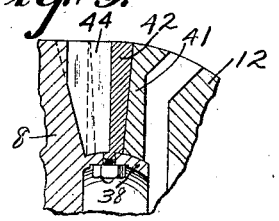
Inventor
Allen D. Whipple
Witness
Attorney Patented May 4, 1926.

1,583,379

UNITED STATES PATENT OFFICE.

ALLEN DEWEY WHIPPLE, OF MILWAUKEE, WISCONSIN.

MOTION-TRANSMITTING APPARATUS.

Application filed August 8, 1919. Serial No. 316,200.

*To all whom it may concern:*

Be it known that I, ALLEN D. WHIPPLE, a citizen of the United States, residing at Milwaukee, county of Milwaukee, and State of Wisconsin, have invented new and useful Improvements in Motion-Transmitting Apparatus, of which the following is a specification.

My invention relates to improvements in motion transmitting apparatus.

The object of my invention is to provide improved mechanism for utilizing a circulating liquid for the transmission of motion in either of two directions, and at varying speed and inversely varying power, without any necessary variation in the speed of the prime mover, and without material loss of energy, due to the speed variation, or to leakage, or so-called slip.

To accomplish the above object, it is essential that the liquid shall be free to yield under pressure of the mechanical driving members employed to compel a circulation of the liquid. But it is important, if not essential, that such yielding of the liquid shall be permitted under power transmitting conditions only by displacement of driven mechanical members or parts, (the liquid being utilized without expansion chambers or air ports, etc.), whereby the force of a substantially incompressible body of liquid completely filling a non-expansible chamber may be employed to transmit energy without material diminution, and also without material variation in form, except as to such variation as may be required to develop increased speed at the expense of power, or increased power with a corresponding speed reduction.

In the drawings:—

Figure 2 is a sectional view, drawn on line 2—2 of Figure 1.

Figure 3 is an inner face view of the right hand member, or piston of the driving rotor.

Figure 4 is an inner face view of the left hand driving member.

Figure 5 is a detail side view of the casing for the driving rotor, showing the inlet port.

Figure 6 is a view of the same, as seen from the inner end.

Figure 7 is a detail side view of a packing member adapted to oscillate only in a plane which includes the axis of the member with which it is associated.

Figure 8 is a detail view of one of the packing members which oscillates upon an axis radial to the shaft, and also slides in a plane which includes the shaft axis.

Figure 9 is a detail sectional view of the driving member, drawn on line 9—9 of Figure 1.

Like parts are identified by the same reference characters thruout the several views.

Figure 1:
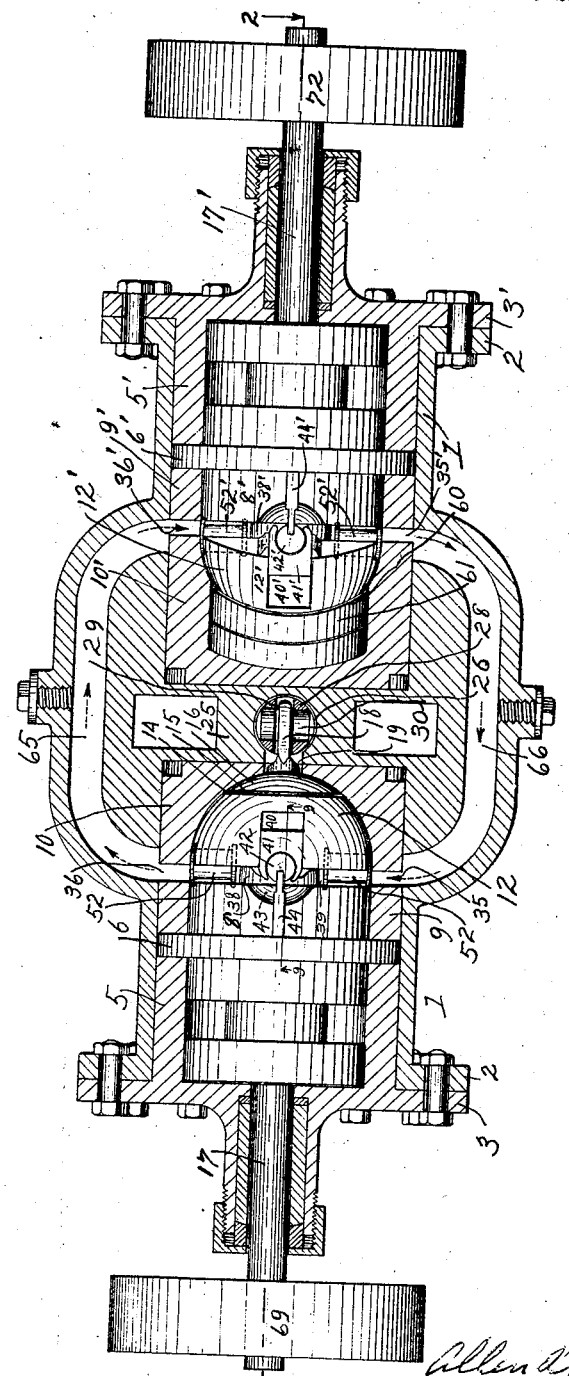
Figure 1 is a sectional view of a power unit embodying my invention, said power unit including a set of driving members in co-operation with a set of similarly constructed driven members, the section being taken generally on a plane which intersects the axes of the communicating ducts connecting the driving with the driven rotors.

The apparatus illustrated in the drawings includes an outer shell or casing 1, of a generally cylindrical form, having end flanges 2, which are bolted to the heads or caps 3, to which the rotor enclosing cylinders are secured. These rotor enclosing cylinders are two in number in the construction shown, one cylinder enclosing the driving rotor and the other enclosing the driven rotor. The cylinder enclosing the driving rotor is formed of a series of sections, separable from each other to facilitate assembly. The outer section 5 is secured to the head 3 at the driving end of the machine, and may be formed integrally with the head. This section 5 and a disk 6 secured to the inner end thereof, enclose the bearings, (preferably antifriction), for the power receiving member 8 of the driving rotor, the latter being enclosed by the cylinder section 9.

The inner cylinder section 10 comprises the inner cylinder head, and this is provided with a spherically curved socket to receive the driven member or piston 12. This member has its spherically rounded surface closely fitted to the walls of the socket, but has a flat inner face 14 annularly channeled to receive antifriction thrust bearing balls 15, which are also received in a suitable raceway formed in a bearing segment 16, seated in the socket of the cylinder head 10, substantially in line with the axis of the driving shaft 17, when the piston is in neutral position.

The piston 12 and the bearing segment 16 are adapted to be oscillated in the cylinder head socket by an arm or lever 18 socketed in, or connected with, the bearing member 16, and which projects thru a horizontally elongated rectangular aperture 19 in the cylinder head 10.

The casing is provided with a central partition wall 25, having a transverse aperture 26 to receive a shifting rod 27 and plunger 28, the latter having a socket 29 within which the power end of the lever is received, and pivotally connected with the plunger 28 at 30, the pivot pin being flattened and fitted to an open ended slot in the end of the lever, as best shown in Figure 2.

The rotor enclosing cylinder is provided with oppositely disposed ports 35 and 36 in registry with the space between the opposing faces of the driving member 8 and piston 12, these members being separated sufficiently to provide a liquid receiving cavity between them. The member 8 is provided with an annular projection 38, the outer surface of which is spherically rounded, and adapted to be received within a socket in the working face of the piston, said socket having an annular zone 39, the surface of which is spherically rounded to receive the outer surface of the projection 38 on the member 8, and form therewith a liquid tight joint.

The face of the piston 12 which opposes the member 8, and which is herein called the working face, is provided on opposite sides of the bearing zone 39 with recesses 40, adapted to receive sliding packing blocks 41, having radial pivot sockets to receive pivot pins 42 projecting from the spherically rounded flange 38 carried by the member 8. These pivot pins are connected by wing flanges 42 with the working face of the member 8, and the latter is recessed at 43 to allow the packing blocks 41 to oscillate upon the pivot pins 42, without striking the member 8.

The pivot pins 42 have their axes co-incident with lines which radiate from the center of a sphere with which the outer surface of the piston 12 coincides, and these radial lines are in the plane of a great circle of said sphere, which extends at right angles to the axis about which the piston rotates. With this construction, two oppositely disposed packing members 41 may oscillate upon the pivot pins, and may also slide back and forth in their piston recesses without cramping, and under conditions in which the axis of piston rotation is oblique to the axis of the shaft 17, this being the case whenever the adjusting lever or arm 18 is swung toward one side or the other by the plunger 28, and adjusting rod 27.

But the space between the members 8 and 12 is further sub-divided by wing flanges 50. These are also oppositely disposed, and arranged to project over the spherically rounded bearing surface 38 into recesses 51 in the piston 12. The side walls of these recesses converge toward the working face of the piston, and each such recess is closed at the working face by the wing 50, and a set of oscillatory packing blocks 52, one on each side of the wing. These packing blocks 52 are in general similar to a longitudinal segment of a spool, arranged with a spherically rounded outer head piece 52 in a position to fit the spherically rounded surface of the cylinder head 10. The inner head 55 of the spool has a concavely rounded surface, adapted to fit the spherically rounded surface of the driving member flange 38.

The core of the segment 57 has its flat face bearing upon the wing flange 50, and its cylindrical surface fitted to a corresponding surface on the piston 12. The spool segments follow the movements of the piston, being sufficiently interlocked therewith so that they will be held to the piston sockets by the wing flange 50. But they will slide longitudinally along the surface of the wing flange, and will also oscillate in the piston sockets in accordance with the relative movement of the wing flange 50 toward one side or the other of the recess 51. These spool segments, however, will always oscillate about an axis, which lies in the plane of the same great circle which includes the pivot pins 42.

I have therefore provided two sets of oppositely disposed oscillatory packing members or spool segments which oscillate about their pivotal axes, but travel with the piston 12 and two oppositely disposed sliding packing blocks 41, which oscillate upon pivot axes in the plane of the same great circle, but travel with driving member 8, their sliding movement in the piston sockets being merely relative to the piston 12 which in fact slides upon these packing blocks 41 as the piston sockets approach and recede from the member 8.

It will be understood from the foregoing description, that the space between the piston 12 and the driving member 8 is sub-divided by the wing flanges 42 and 50, and their respective packing members 41 and 52 into four liquid receiving cavities, indicated at A, B, C and D in Figures 3 and 4, and when the piston 12 is adjusted to rotate upon an axis oblique to the axis of the shaft 17 and the driving member 8, these cavities will progressively decrease in capacity as they approach the central horizontal plane of the machine on one side, and will progressively increase in capacity on the other side of such plane, the adjustment of the arm 18 being a horizontal adjustment. Therefore, liquid may be drawn into the chambers which are increasing in capacity, thru the slot port 35, (or 36), and expelled from the chambers which are decreasing in capacity, thru the slot port 36, (or 35). A reversal of the flow of liquid will occur whenever the adjusting arm 18 is shifted across the center line of the shaft 17. By constructing the packing members 41 in such a manner that they may oscillate upon the pivot pins 42, and also slide in their sockets in a plane which includes the axis of piston rotation, it is possible for all the packing members to conform to the surfaces of the wing flanges 42 and 50, and also to the spherically rounded surfaces of the cylinder head 10, without cramping or binding, even when occupying an intermediate position between the point of greatest convergence between the piston 12 and driving member 8, and the point of maximum separation.

By locating the pivot pins 42 with their axes in the plane of a great circle, of which the piston 12 is a segment, and by locating the packing members 52 to oscillate in the same plane, and by further providing for a sliding movement of the packing members 41, whereby the "reach" of the wings 42 may progressively increase during a part of one turn, and diminish during another part of the same turn, I have solved the problem of packing a rotary pump or motor of the type herein described, and am able to avoid destructive wear and cramping effects, such as have heretofore prevented a successful use of such pumps and motors.

The driven rotor.

With the exception hereinafter pointed out, the driven rotor is of like structure as the driving rotor above described, and the same reference characters are applied to the corresponding parts, with prime marks added for the purpose of distinction between the driving and the driven rotor, and not as indicating structural difference. But the position of the driven rotor is reversed, and the port 36' constitutes the inlet port for this rotor when the port 36 is the outlet of the driving rotor. The only structural difference is in the fact that the axis of rotation of the piston 12' does not require to be changed, but may be left permanently oblique to the axis of the driven shaft 17', and at the same angle thereto, all variations in speed and power as transmitted to the driven shaft 17' being accomplished by adjustments of the axis of rotation of the piston 12 of the driving rotor or pump, and the speed of the driven rotor will therefore be in direct proportion to the quantity of liquid forced thru it by the driving rotor or pump.

I therefore mount the driven piston 12' in a cylindrical bearing member 60 which rotates upon a permanently fixed bearing member 61 with suitable anti-friction devices interposed.

It will be observed that the port 36 of the driven rotor or pump is connected with the port 36' of the driven rotor or motor by a passage 65, this passage being preferably of a considerably greater capacity than the ports. Similarly, the port 35' is connected with the port 35 by a passage 66. These passages are preferably formed in a central enlargement of the casing 1.

Briefly reviewing the operation of the machine, it will be observed that if power is applied to the shaft 17 thru a pulley 69, or any other form of connection, then liquid will be pumped by the driving rotor, when the parts are in the position in which they are shown by full lines in Figures 1 and 2, this being the neutral position, with the axis of the piston in line with the axis of shaft 17, or of the driving rotor 8. But if the axis of piston 12 be then shifted by adjusting the arm 18 thru the medium of the hand wheel 70, feed nut 71, rod 27 and plunger 28, the piston will then rotate upon an axis oblique to that of shaft 17, and liquid will be pumped in proportion to the angularity of the adjustment. If the adjustment is as indicated by dotted lines in Figure 2, liquid will be drawn in thru the port 35, and forced out thru the port 36, whereupon the driven rotor or motor will be actuated in the direction indicated by the dotted arrow in said Figure 2. An opposite adjustment of the arm 18 will, of course, reverse the flow of the liquid which will then be drawn in thru the port 36, and delivered thru the port 35, and the motor or driven rotor will then revolve in the opposite direction to that indicated by the arrow in Figure 2. The shaft 17' is illustrated as provided with a pulley 72, thru which the transmitted power may be delivered from the apparatus.

In the driven rotor the member 8' is of course the driven member of the rotor and the wing flanges are the members against which the liquid exerts its working pressure, the member 12' merely serving as a rotating abutment.

This application is in part a continuation of my former application, Serial No. 41,464, filed July 23rd, 1915, and the renewal thereof, Serial No. 268,862, filed December 30th, 1918.

I claim:—

1. Motion transmitting apparatus, including the combination with a ported casing, having an interior surface provided with a spherically rounded zone, of a rotary piston having a spherically rounded surface fitted to the surface of said zone, said piston having its working face recessed, and provided with packing members adapted to oscillate about axes radiating in a common plane from a center with which said rounded surfaces are concentric, a rotary driving member having a working face opposed to that of the piston, and having wing partitions adapted to cooperate with the packing members in connecting the driving member with the piston to rotate the latter, and to form liquid receiving pockets between them, adapted for registry with the casing ports when the driving member is rotated.

2. Motion transmitting apparatus, including the combination with a ported casing, having an interior surface provided with a spherically rounded zone, of a rotary piston having a spherically rounded surface fitted to the surface of said zone, said piston having its working face recessed, and provided with packing members adapted to oscillate about axes radiating in a common plane from a center with which said rounded surfaces are concentric, a rotary driving member having a working face opposed to that of the piston, and having wing partitions adapted to cooperate with the packing members in connecting the driving member with the piston to rotate the latter, and to form liquid receiving pockets between them, adapted for registry with the casing ports when the driving member is rotated, and means for adjusting the axis of piston rotation at differing inclinations to that of driving member rotation, and also in alignment therewith.

3. Motion transmitting apparatus, including the combination with a ported casing, having an interior surface provided with a spherically rounded zone, of a rotary piston having a spherically rounded surface fitted to the surface of said zone, said piston having its working face recessed, and provided with packing members adapted to oscillate about axes radiating in a common plane from a center with which said rounded surfaces are concentric, a rotary driving member having a working face opposed to that of the piston, and having wing partitions adapted to cooperate with the packing members in connecting the driving member with the piston to rotate the latter, and to form liquid receiving pockets between them, adapted for registry with the casing ports when the driving member is rotated, and means for adjusting the axis of piston rotation across that of driving member rotation in a plane between the casing ports.

4. Motion transmitting apparatus, including the combination with an oppositely ported casing, having an interior socket at one side of its ports, provided with a surface having a spherically rounded zone which includes a great circle of a sphere in which said surface lies, a piston having a spherically rounded zone fitted to the socket surface, pivot members adapted for oscillation upon axes in the plane of said great circle, when the piston is in neutral position, and provided with spherically rounded outer ends fitted to said socket surface, a rotary driving member within the casing having a working face opposed to the piston, and provided with piston actuating wings operatively engaging said pivot members, and crossing the plane in which the casing ports are located, and means for oscillating the piston to change the axis of its rotation, said piston having sockets in which the actuating wings may slide, and said pivot members being adapted to serve as packings to prevent liquid from passing the wings, whereby when the driving member is rotated upon an axis inclined to that of the piston, liquid may be drawn into the spaces between the wings thru one of the ports, and expelled thru the other port.

5. Motion transmitting apparatus, including the combination with an oppositely ported casing, having therein rotary driving and driven members, having working faces opposed to each other, and adapted when the members are rotated to draw liquid in thru one port and expel it from the other, the space between said working faces being subdivided by wings rigidly connected with the driving member, and pivotally connected with the driven member upon axes radiating from a common center, some of said wings being adapted for relative sliding movements thru the pivotal connections, and others of said wings having pivoted extensions in the driven member, and adapted for relative sliding movements in the sockets, said driven member, casing, wings and pivot members having bearing surfaces spherically rounded and concentric to the center from which said pivot axes radiate.

6. Motion transmitting apparatus, including the combination with an oppositely ported casing, having therein rotary driving and driven members, having working faces opposed to each other, and adapted when the members are rotated to draw liquid in thru one port and expel it from the other, the space between said working faces being subdivided by wings rigidly connected with the driving member, and pivotally connected with the driven member upon axes radiating from a common center, some of said wings being adapted for relative sliding movements thru the pivotal connections, and others of said wings having pivoted extensions in the driven member, and adapted for relative sliding movements in the sockets, said driven member, casing, wings, and pivot members having bearing surfaces spherically rounded and concentric to the center from which said pivot axes radiate, and means for supporting the driven member to rotate upon an axis inclined to the axis of the driving member.

7. Motion transmitting apparatus, including the combination with an oppositely ported casing, having therein rotary driving and driven members, having working faces opposed to each other, and adapted when the members are rotated to draw liquid in thru one port and expel it from the other, the space between said working faces being subdivided by wings rigidly connected with the driving member, and pivotally connected with the driven member upon axes radiating from a common center, some of said wings being adapted for relative sliding movements thru the pivotal connections, and other of said wings having pivoted extensions in the driving member, and adapted for relative sliding movements in the sockets, said driving member, casing, wings, and pivot members having bearing surfaces spherically rounded and concentric to the center from which said pivot axes radiate, means for supporting the driving member to rotate upon an axis inclined to the axis of the driving member, in a plane between the casing ports, and means for shifting the axis of inclination across the projected axis of the driving member.

8. Motion transmitting apparatus, including the combination with a ported casing, having an interior surface provided with a spherically rounded zone, of a rotary piston having a spherically rounded surface fitted to the surface of said zone, said piston having its working face recessed, and provided with packing members adapted to oscillate about axes radiating in a common plane from a center with which said rounded surfaces are concentric, a rotary driving member having a working face opposed to that of the piston, and having wing partitions adapted to cooperate with the packing members in connecting the driving member with the piston to rotate the latter, and to form liquid receiving pockets between them, adapted for registry with the casing ports when the driving member is rotated, said driving member having a projection provided with a spherically rounded surface fitted to a bearing socket in the piston, and over which said wings project.

9. Motion transmitting apparatus, including the combination with a ported casing, having an interior surface provided with a spherically rounded zone, of a rotary piston having a spherically rounded surface fitted to the surface of said zone, said piston having its working face recessed, and provided with packing members adapted to oscillate about axes radiating in a common plane from a center with which said rounded surfaces are concentric, a rotary driving member having a working face opposed to that of the piston, and having wing partitions adapted to cooperate with the packing members in connecting the driving member with the piston to rotate the latter, and to form liquid receiving pockets between them, adapted for registry with the casing ports when the driving member is rotated, said driving member having a projection with a spherically rounded surface concentric with the outer surface of the piston and socketed centrally within the working face of the piston, over which spherical projection the wings extend and upon which they bear.

10. Motion transmitting apparatus, including the combination with an oppositely ported casing, having a cylindrically rounded interior bearing surface at one side of the ports, and a spherically rounded interior bearing surface at the other side of the ports, a rotary driving member fitting the cylindrically rounded bearing surface, and having an axially disposed projection, the outer surface of which is spherically curved and concentric with said spherically curved casing surface, a rotatable driven member fitting said spherically curved casing surface, and socketed to receive said spherically rounded projection, a set of wings on the driving member extending over said projection, and socketed in the driven member, oscillatory packings carried by the driven member, and having flat faces adapted to slide upon the side surfaces of two of the wings, and a pair of oppositely disposed packing blocks pivotally connected with two other wings, and adapted to slide in the wing receiving sockets of the driven member, said oscillatory packing members and slide packing blocks being each adapted to oscillate upon an axis radial to the center about which said spherically bearing surfaces are curved, and provided with bearing surfaces at their outer ends, co-incident with a great circle of the spherically rounded casing surface.

11. Motion transmitting apparatus, including the combination with an oppositely ported casing, having a cylindrically rounded interior bearing surface at one side of the ports, and a spherically rounded interior bearing surface at the other side of the ports, a rotary driving member fitting the cylindrically rounded bearing surface, and having an axially disposed projection, the outer surface of which is spherically curved and concentric with said spherically curved casing surface, a rotatable driven member fitting said spherically curved casing surface, and socketed to receive said spherically rounded projection, a set of wings on the driving member extending over said projection, and socketed in the driven member, oscillatory packings carried by the driven member, and having flat faces adapted to slide upon the side surfaces of two of the wings, and a pair of oppositely disposed packing blocks pivotally connected with two other wings, and adapted to slide in the wing receiving sockets of the driven member, said oscillatory packing members and slide packing blocks being each adapted to oscillate upon an axis radial to the center about which said spherically bearing surfaces are curved, and provided with bearing surfaces at their outer ends, coincident with a great circle of the spherically rounded casing surface, and means for oscillating the driving member to incline the axis of its rotation with reference to the axis of the driving member rotation.

12. Motion transmitting apparatus, including the combination with a casing having therein two sets of rotary members, the members of each set having working faces opposed to each other, and subdivided by wings rigidly connected with one member, and having sliding pivotal connections with the other member, allowing relative oscillation of the wings upon said other member about radial lines extending from the axis thereof in a common plane, one member of each set having a spherically rounded bearing surface fitted to a corresponding bearing surface on the casing, said radial axes of oscillation being co-incident with a great circle of the spherically rounded casing surface, and said casing having ports on opposite sides thereof for the admission and exhaust of liquid.

13. Motion transmitting apparatus, including the combination with a casing having therein two sets of rotary members, the members of each set having working faces opposed to each other, and subdivided by wings rigidly connected with one member, and having sliding pivotal connections with the other member, allowing relative oscillation of the wings upon said other member about radial lines extending from the axis thereof in a common plane, one member of each set having a spherically rounded bearing surface fitted to a corresponding bearing surface on the casing, said radial axes of oscillation being co-incident with a great circle of the spherically rounded casing surface, and said casing having ports on opposite sides thereof for the admission and exhaust of liquid, together with means for adjusting the spherically rotary member to rotate upon an axis inclined with the axis of rotation of the other member.

14. A motion transmitting apparatus including a force pump comprising the combination of a ported cylinder provided with a head having a spherical inner surface, a driving member adapted to rotate within the cylinder, a driven member adapted to be rotated within the spherical portion with which its outer surface is concentric, means for driving the second rotary member from the first, said means being so disposed as to divide the space between the driving and driven members into compartments, and means for moving angularly the axis of the driven member about a pivot co-incident with the center of the spherical surfaces whereby the said compartments may be caused to vary in size to a greater or less degree in the period of rotation to pump a fluid in one direction or the other thru the cylinder ports.

15. A motion transmitting apparatus including the combination of a rotary pump comprising a ported cylinder provided with a head having a spherical inner surface, a pair of members adapted to rotate within the cylinder, one of which is driven from the other and is located entirely within the spherical portion of the head with which it conforms in shape, means for flexibly connecting together the adjacent faces of the rotary members, said means being so disposed as to divide the space between these members into a plurality of compartments, means for angularly turning the axis of the driven member to coincide with any radius of its spherical portion in one plane whereby said compartments may be caused to vary in capacity to a greater or less degree during such revolution of the rotary members.

In testimony whereof I affix my signature.

ALLEN DEWEY WHIPPLE.